United States Patent [19]

Knappe

[11] 4,415,798
[45] Nov. 15, 1983

[54] PLATE FOR RADIANT HEATING OR SIMILAR EFFECTS

[75] Inventor: Horst Knappe, Nuremberg, Fed. Rep. of Germany

[73] Assignee: Ilona Knappe, Walldorf, Fed. Rep. of Germany

[21] Appl. No.: 187,681

[22] Filed: Sep. 16, 1980

[30] Foreign Application Priority Data

Sep. 17, 1979 [DE] Fed. Rep. of Germany ....... 2937498
Sep. 2, 1980 [DE] Fed. Rep. of Germany ....... 3032968

[51] Int. Cl.$^3$ ............................................. H05B 3/26
[52] U.S. Cl. .................................. 219/345; 219/213; 219/553
[58] Field of Search .................. 165/49, 168, 169, 170; 219/345, 213, 528; 338/252, 253, 293, 290, 311

[56] References Cited

U.S. PATENT DOCUMENTS

| 1,112,582 | 10/1914 | Whittlesey | 219/467 |
| 1,505,681 | 8/1924 | Warner | 219/455 |
| 1,534,673 | 4/1925 | Weir | 219/465 |
| 2,138,217 | 11/1938 | Sutter | 219/345 |
| 3,234,355 | 2/1966 | Freeman | 219/213 |
| 3,277,273 | 10/1966 | Williams | 219/345 |
| 3,479,490 | 11/1969 | Stark | 219/345 |
| 4,247,979 | 2/1981 | Eck | 219/345 |

FOREIGN PATENT DOCUMENTS

| 2336902 | 6/1975 | Fed. Rep. of Germany . | |
| 554700 | 7/1943 | United Kingdom | 219/213 |
| 779266 | 7/1957 | United Kingdom | 219/528 |
| 816149 | 7/1959 | United Kingdom | 219/213 |

Primary Examiner—Bernard Roskowski
Attorney, Agent, or Firm—Jordan and Hamburg

[57] ABSTRACT

A radiant heater for heating the surrounding environment or for transferring heat therein to a remote location. In one embodiment the radiant heater comprises a plate provided with a series of interconnecting grooves in the surface thereof. Disposed in the grooves is either a wire for producing heat when an electric current is passed therethrough or a tube for conducting a fluid, the temperature of which may be greater than, equal to, or less than the temperature of the region surrounding the tube. The wire or tube may be confined within the grooves by a filter material occupying substantially the portion of the grooves not occupied by the wire or tube. In another embodiment, the radiant heater comprises a flat container for such wire or for conducting a fluid, which container is sandwiched between two plates. Several radiant heaters may be functionally interconnected.

8 Claims, 13 Drawing Figures

PLATE FOR RADIANT HEATING OR SIMILAR EFFECTS

BACKGROUND OF THE INVENTION

This invention relates to a plate for radiant heating made from natural or cast stone with a channel disposed within the plate body or upon the plate surface for acceptance of a heat carrier or electrical heating conductor, where both ends of the heat carrier or the heating conductor issue extend outside the plate.

Federal Republic of Germany Patent Application DE-OS No. 2 336 902 discloses a plate made from clay-like materials which provides radiant heating. This plate contains an extended tube-like cavity which is embedded into the plate while it is castable and malleable. This procedure is suitable neither for natural stone nor for plates consisting of concrete, which are desirable mainly because of their higher strength, but also because of their many other properties useful for radiant heating. It is extremely difficult to provide in a natural stone plate boreholes parallel to the surface thereof for containing a heat carrier or an electrical heating conductor. Therefore a practical way of providing natural stone plates or concrete plates with such channels for accepting a heat carrier or a heating conductor.

This objective is achieved according to the present invention by furnishing a plate of natural stone or concrete with a groove which is sunk into the outer surface of the plate, the groove being closed flush with the surface of the plate while leaving a cavity in the groove. Such grooves may be cut into the plates or milled into the plates by appropriate cutting tools.

It was found to be particularly advantageous to dispose in the groove a tube or a pipe and to fill the remaining groove space with a filler. Such filling may be done with a synthetic resin, especially an epoxide resin containing a filler such as rock meal. This procedure does not impair the appearance of the plate. On the other hand it is comparatively easy to manufacture such channels using natural stone plates.

When one wants to expend the labor for sinking the grooves and particularly when one wants to increase the length of heat carrier or heating conductor per unit of plate surface area, the invention provides that the grooves are circular, where two adjacent grooves overlap each other by one groove width and such that the heat carrier or the electrical heating conductor bends in an opposite direction as it passes from one circular groove to the adjacent groove.

According to experience, a tool rotating about an axis perpendicular to the plate surface, such as an annular cutting die head, is more effective than a conventional knifing disk for forming the grooves. The work-piece may be fastened for this method of groove formation. The toolhead, containing in some instances several tools, may be changed in a predetermined path of motion after cutting each individual circular groove. The overlap of the circular grooves allows easy transit of a pipe or a conductor within two circular grooves, in which case the direction of transit changes. The pipe or heating conductor thereby assumes a snake-like shape so that a large amount of heat carrier or heating conductor may be disposed per unit area of the plate. The circular grooves allow the pipe or conductor to be guided in circular arcs without sharp bends so that trouble-free passage of heat producing current is guaranteed.

In the simplest embodiment, it is sufficient to provide a continuous row or rows of circular grooves on the plate surface. In another embodiment the circular grooves are arranged at regular intervals in rows running perpendicularly to each other. In such embodiment, the heat carrier pipe or the heating conductor is guided with a looping angle of 180° when making the transit from one circular groove to the next groove within the same row and with a looping angle of 270° at the turning point at the end of each row when making the transit from one groove to the next groove within an adjacent row. Each parallel row of circular grooves is occupied by a single length of heat carrier pipe or heating conductor, in which case the pipe or conductor ends are provided with appropriate fitting elements.

In an alternative embodiment, the circular grooves are arranged at regular distances in rows running at acute angles to each other. In this embodiment, the snake-like shape of the pipe or conductor is less widely undulating, which may be advantageous under certain circumstances.

In order to obtain a continuous groove for accepting the pipe or the conductor, it may be advantageous to open the outermost portion of the circular grooves of the outermost rows at one or more plate edges. It is within the scope of this invention to close these outlets on the edges of the plate. Such closing may be done also with a synthetic resin or a stone-like material.

According to another feature of the invention, the outer diameter of the pipe or hose disposed in the groove corresponds to the inner width of the groove. This feature causes maximum utilization of the cross section of the groove as well as a high cross section of streaming. The same can be said for the electrical heating conductor, which is usually formed as a coil or a helix. The pipe or hose is preferably fitted with ribs.

It is also within the scope of the present invention to close the groove worked into the plate surface with an additional, adjoining plate. In this embodiment the heat conducting mass is considerably enlarged by such provision of a second stone plate. Thereby the closure of the groove may be performed in a particularly easy manner. In this case, of course, pipe or hose may be placed within the groove. Both plates may be glued together by using a suitable synthetic resin. The second plate may consist of a plate formed of metal or synthetic material or also multiple layers of materials.

Another embodiment of the invention provides that the groove consists of a substantially planar container whose outline corresponds to the outline of the plate surface. The outline of this container is a little smaller than the outline of the plate surface, and the container lies sandwiched between the two plates, with each of its sides in facing engagement with each plate. The two plates are connected to each other and spaced at a distance corresponding to the thickness of the container. The remaining interstice between the plates is filled with a suitable filling material. The formation of the grooves in the plate face is here obviated. Both plates are easily maintained at the desired distance by spacers so that the container walls abut the plates. The interstice, existing in the region of the outer edges of the plates, is preferably filled with a synthetic resin, particularly an epoxide resin so that a closed cladding panel results, which may be prepared as a unit and may also be mounted as a unit.

In another alternative embodiment, one plate or both plates are provided on their mutually opposing faces with an indentation for accepting the container, the maximum depth of the total indentation corresponding to the thickness of the container, and the shape of the indentation corresponding to the shape of the container. In this case too the surfaces of both plates abut, with exception of the surface area comprising the indentations in one or both plates. In the situation where the depth of the indentation is less than the thickness of the container, a spacer is provided to maintain the plates at a suitable spacing and a filler is used to fill the remaining gap. Otherwise, the two plates abut in the region near their edges.

The container according to another embodiment of the invention is formed of rubber or another material of similar properties, such as a synthetic resin. It may also be formed of sheet metal and, in that case, may have components which are interconnected and which are able to define individual channels.

In the embodiments where the two plates abut in the region near their edges, the channels or grooves open at the plate edges. The channels may communicate with the channels in another similar plate arrangement by suitable pipe connections so that the channels of a plurality of such plate arrangements are connected in series. It is also possible to have the channels open into the surface of a plate. Such construction is particularly suitable when a connection to pipes from a heating unit is desired.

Such plate arrangements may be extensively used for the cladding of brick or cement buildings and may be fastened thereto by wall anchors. The sometimes very large facades of buildings are often exposed to considerable irradiation by sunlight, which hitherto has not been utilized. Conventional solar collectors are usually located on rooftops where they are out of the way. Nevertheless the integration of solar collectors in the architectural design of a building is an extraordinarily difficult problem, especially when the collector is located at the outside of a building wall and is immediately connected to a heat reservoir within the wall or is connected through such reservoir to a heater located at the inside of the wall. Moreover, such collectors are now provided with a transparent outer cover and are unesthetic. The degree of effectiveness of such a solar collector arrangement, even with an immediate spatial connection of collector, heat reservoir and heater, is low and is suitable only at high irradiation levels.

Effective use of extremely large facades of buildings has not been accomplished. Therefore an urgent need exists to solve this problem in a manner suitable for architectural preferences. The above described plate arrangements of the present invention may easily be included in a solar heating system furnished with a conventional heatpump and leave the general esthetic appearance unimpaired, while effectively using heat resulting from incident sunlight.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
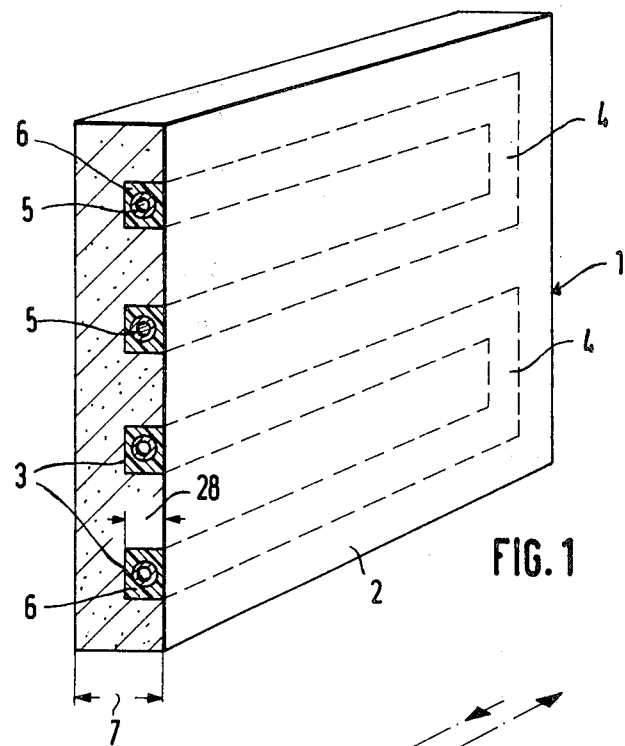
FIG. 1 is a partial sectional view of a cladding element consisting of a single plate according to the present invention.

The cladding element shown in FIG. 1 consists of a plate 1 having a rectangular shape and provided with a groove in the surface thereof. The groove possesses a zig-zag shape and is preferably milled into the plate 1. The groove includes a series of parallel sections 3 connected to each other in series near the plate ends by groove end sections 4. A flexible pipe 5 preferably made out of plastic is disposed in the grooves and the remaining groove space is tightly packed with a resinous filler, which is designated by the numeral 6. The depth 28 of grooves is equal to one-half the thickness of the plate.

Figure 2:
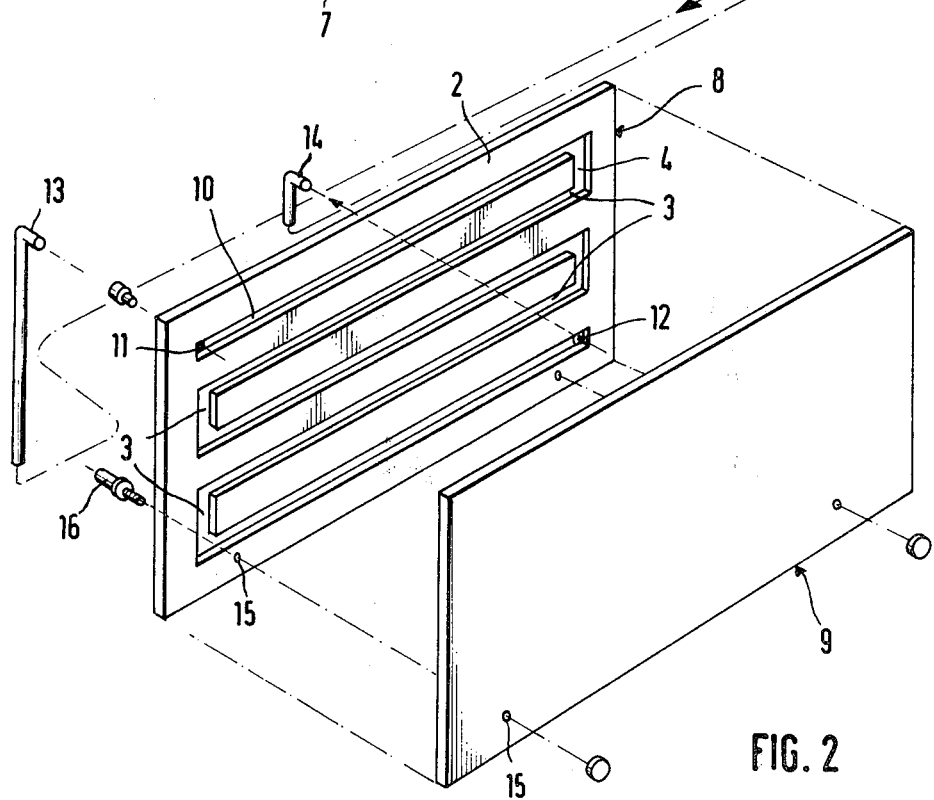
FIG. 2 is an exploded view of another cladding element according to the present invention.

In the embodiment shown in FIG. 2, the cladding element comprises two stone plates 8, 9, where the groove is worked into the face 2 of only one plate 8. The groove forms a continuous channel 10 ending at the regions designated by the numerals 11 and 12 and is furnished with two connecting joints 47 which connect to the pipes 13 and 14 through which a streaming heat carrier is fed to and exhausted from the channel 10. The two plates 8, 9 are glued together where their interfacing surfaces abut. The channel 10 may preferably be covered with an additional coating of a synthetic resin, which serves to improve the seal in the partition plane between the two plates 8, 9.

The cross section shape of the groove may assume any desired shape and is primarily a function of the milling tool used or, in the case of grooves formed in artificial stones, of the mold. When the two plates 8, 9 are bonded at their interfacing surfaces, they may be fastened as a unit to a wall or a similar structure by wall anchors 16 passing through corresponding boreholes 15 in the plates. Although as shown in FIG. 2, no pipes are disposed in the groove, it should be recognized that pipes may be so disposed.

Figure 3:
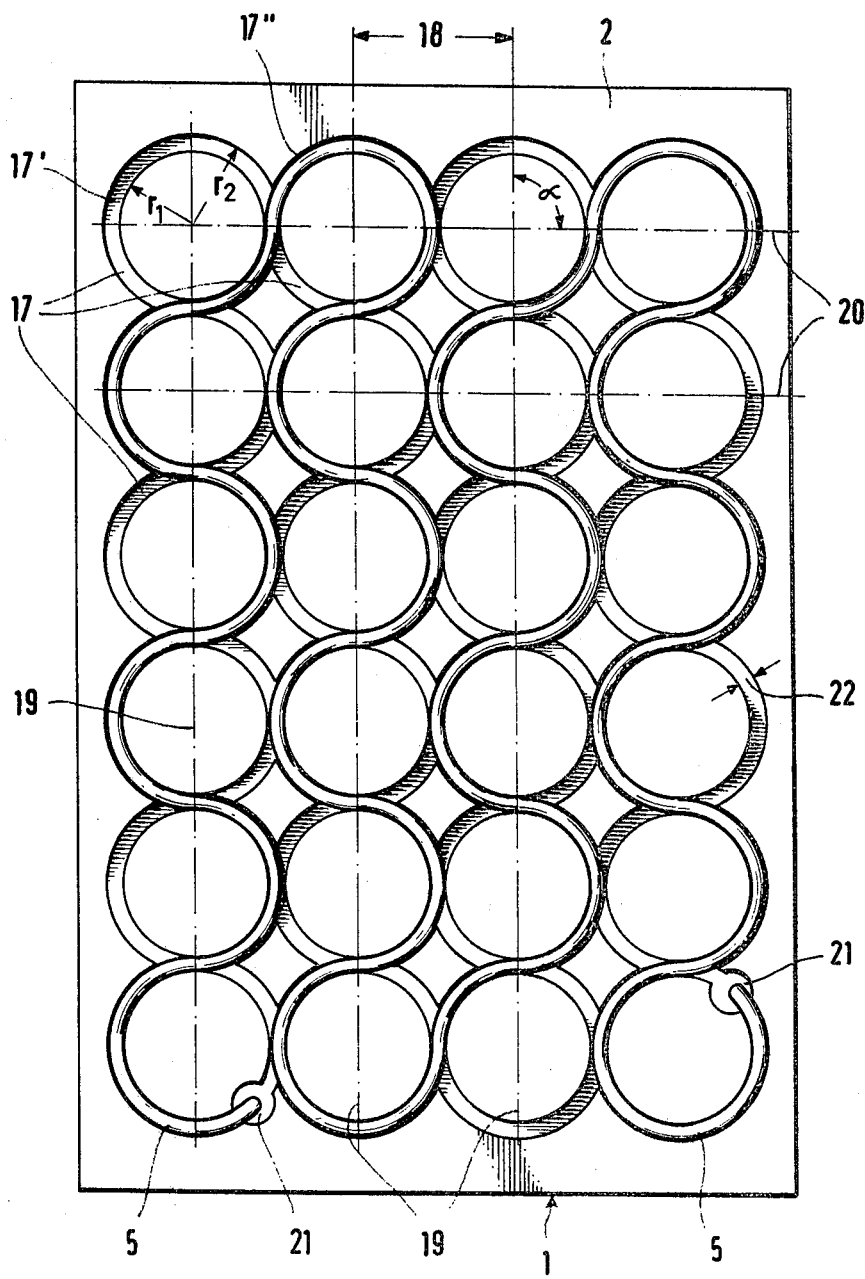
FIG. 3 is a top view of a grooved plate and a flexible pipe of another cladding element according to the present invention.

The plate depicted in FIG. 3 is provided with four rows 19 of six circular grooves 17 cut into the plate surface 2. Each circular groove 17 has an internal radius $r_1$ and an external radius $r_2$, and the distance 18 between the rows 19 equals $r_1 + r_2$. The crossrows 20 of circular grooves 17 are disposed at a right angle $\alpha$ to the rows 19. As shown in the lower region of FIG. 3 a cylindrical recess 21 is disposed within each of two grooves 17 located at the corners of the plate 1. These recesses 21 are bored perpendicular to the plate surface 2.

Figure 4:
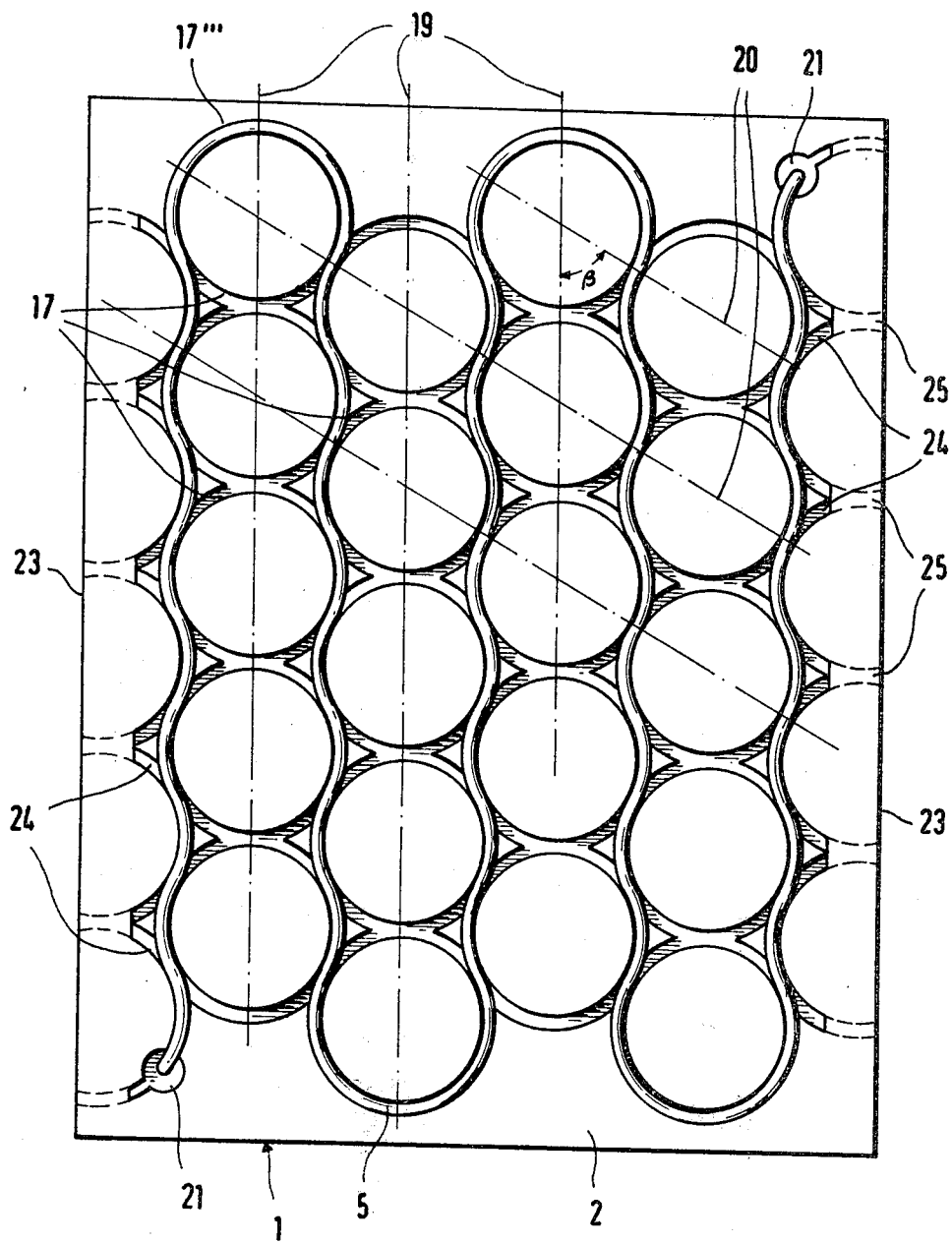
FIG. 4 is a top view of a grooved plate and a flexible pipe of another cladding element according to the present invention.
Figure 5:
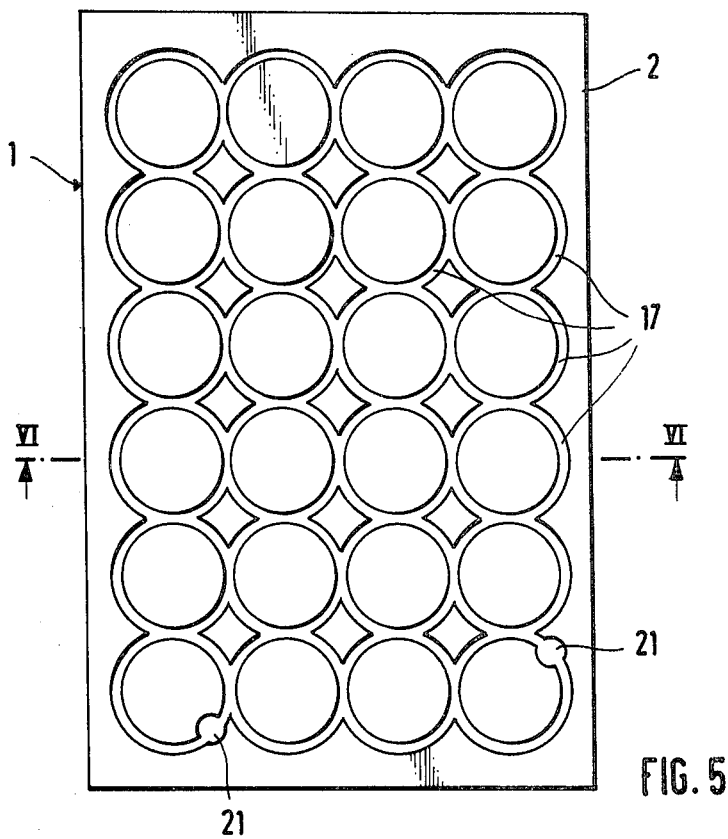
FIG. 5 is a top view of the grooved plate shown in FIG. 3.

In the embodiment shown in FIG. 4, the rows 19 and 20 of circular grooves 17 are arranged in such a manner that they form an acute angle $\beta$ with each other. Nevertheless, adjacent circular grooves 17 overlap each other along their whole breadth 22 much like the groove overlapping shown in FIG. 3.

A ribbed hose 5 is disposed in the circular grooves 17 of FIG. 3, the diameter 29 of the hose 5 corresponding to the breadth 22 of each circular groove 17. The hose 5 enters the plate 1 through one of the recesses 21 and proceeds at first through the circular grooves of the corresponding row 19 where it follows 180° of the circumference of each circular groove 17, with exception of the circular groove 17' at the end of this row. The hose 5 follows the groove 17'' through only 90°. Thereafter the hose 5 follows the circular groove 17'' in the adjacent row 20 through 270°. When the hose 5 travels from one circular groove 17 to the next one, it is bent in an opposite direction. This process is repeated in all the rows 19 of six circular grooves 17 until the hose 5 finally exits through the other recess 21.

In the embodiment shown in FIG. 4, additional circular groove sections 24 are provided at both oppositely disposed lateral edges 23 of the plate 1. These additional circular groove sections form only semicircles, and their lateral edge openings 25 are closed or blocked.

Figure 8:
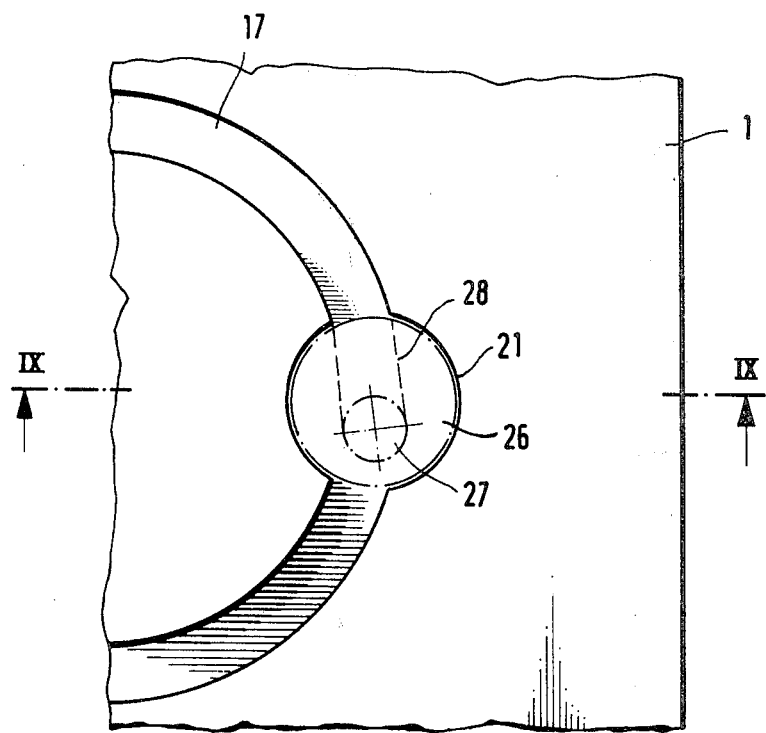
FIG. 8 is an enlarged view of a portion of FIG. 5 showing more detail.
Figure 9:
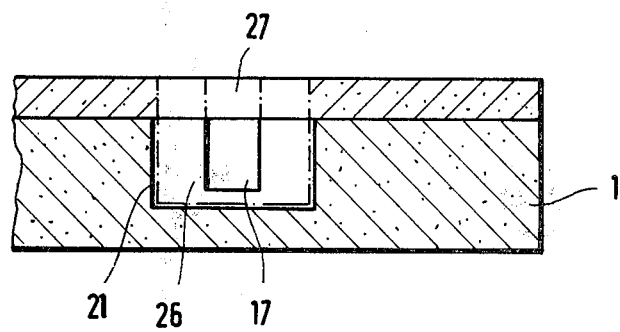
FIG. 9 is a sectional view taken along line IV—IV in FIG. 8.

It is possible in the embodiment shown in FIG. 4 to guide the hose 5 through the grooves in a considerably more elongate path. The hose 5 is guided each time through an arcuate angle of 60° along each of the circular grooves 17 in rows 19. However, at the end of each row 19 the hose winds around the corresponding circular groove 17''' through an arcuate angle of 240°. The recesses 21 provided for the hose entrance and exit are disposed in the grooves at opposite corners of the plate. As shown in FIGS. 8 and 9, a cylindrical plug 26 is fitted tightly into the correspondingly shaped recess 21. The cylindrical plug 26 is provided with a borehole 27 opening perpendicular to the plate surface and also with an outlet 28 extending from the borehole 27 and opening into the circular groove 17.

Figure 6:
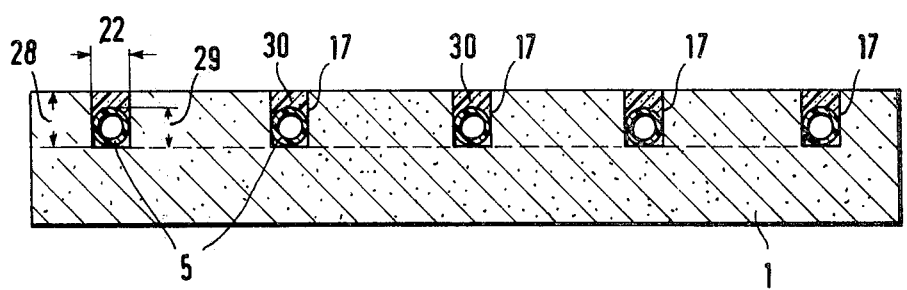
FIG. 6 is a sectional view taken along line VI—VI in FIG. 5.
Figure 7:
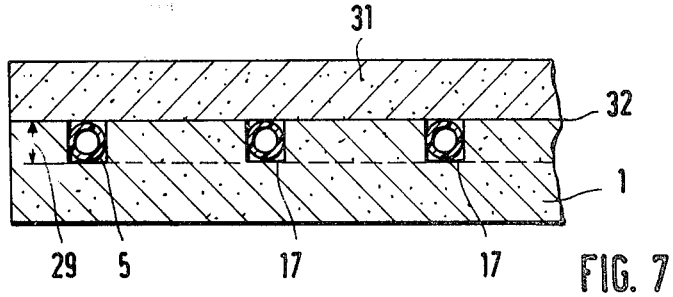
FIG. 7 is a partial sectional view of another cladding element according to the present invention corresponding to the sectional view of FIG. 6.

As shown in FIGS. 6 and 8 the breadth 22 of each groove 17 equals the diameter 29 of the hose 5 disposed within the groove. Contrastingly, the depth 28 of each groove 17 is larger than the hose diameter 29. The remaining empty portion of each groove 17 is filled with a synthetic resin or rock material 30. In the embodiment shown in FIG. 7, however, the depth of each groove 17 and the diameter 29 of the hose 5 are equal, and the circular grooves 17 of plate 1 are closed by an overlying second plate 31. The plane of contact 32 between the two plates 1, 31 is preferably sealed by glueing with a synthetic resin.

Instead of a pipe or a hose 5, an electrical conductor usually having a spiral configuration may be arranged within the grooves 17.

Figure 10:
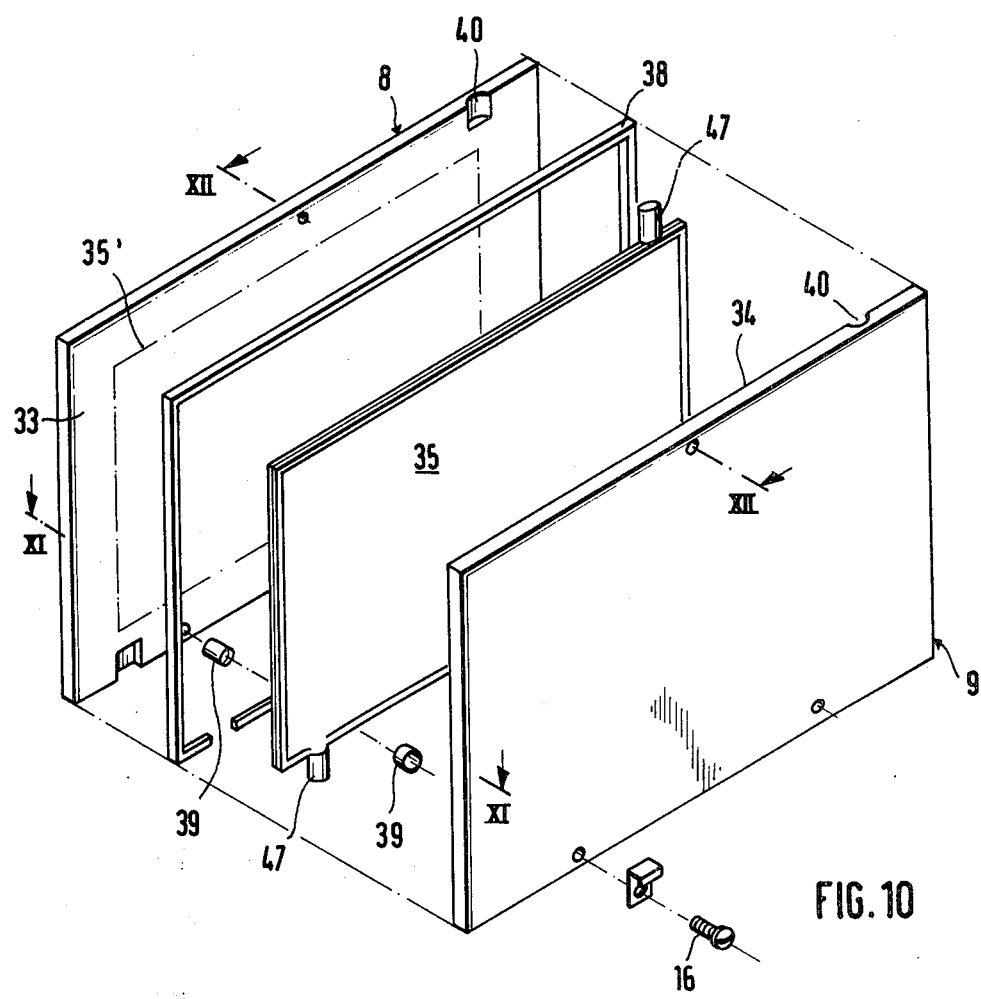
FIG. 10 is an exploded view of another cladding element according to the present invention.
Figure 11:
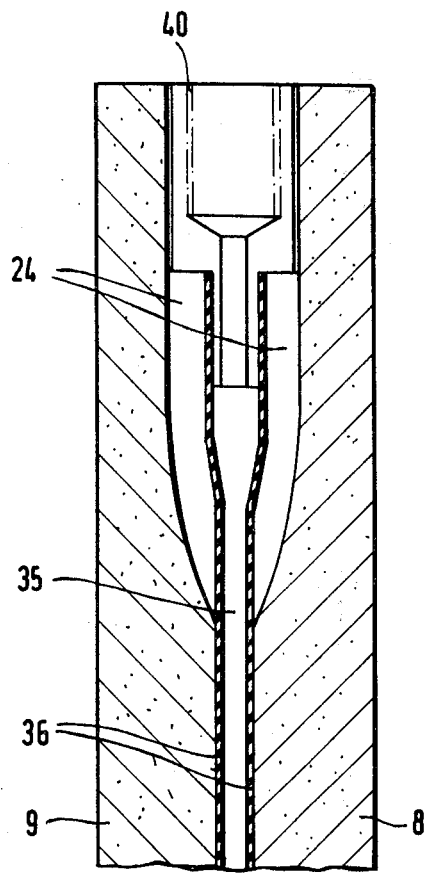
FIG. 11 is a partial sectional view taken along line XI—XI in FIG. 10.
Figure 12:
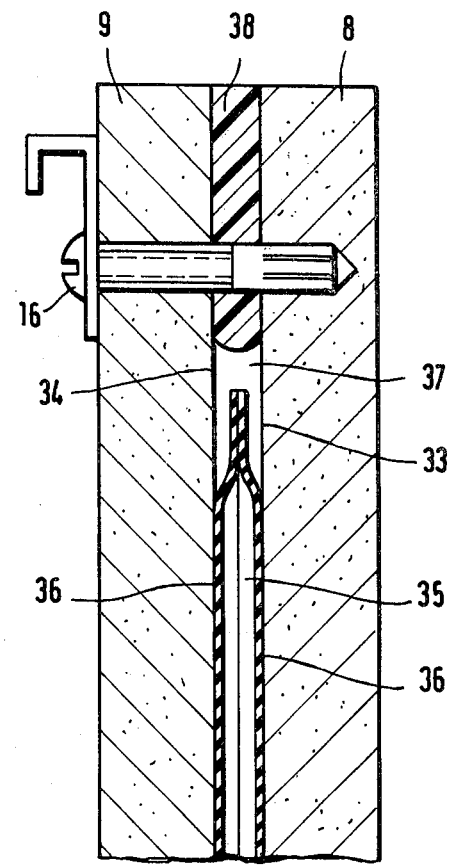
FIG. 12 is a partial sectional view taken along line XII—XII in FIG. 10.

The embodiment shown in FIGS. 10 to 12 also uses two interfacing plates 8, 9 for the cladding element. Between the interfacing surfaces 33, 34 is disposed a flat pouch or container 35, which may be formed of rubber having an outer border, as illustrated by its projection 5' onto the interfacing surface 33 of plate 8, corresponding to the outline of plate surface 33 and having an area slightly smaller than that of plate 8. The container 35 is provided with two connectors 47 which serve as the inlet 13 and and outlet 14 therefor, and which are disposed generally in the plane of the cladding element thereby favoring an edge to edge series arrangement of adjacent cladding elements. The two container walls 36 closely abut the two interfacing surfaces 33, 34 of the plates 8, 9, and the gap 37 between the plates 8, 9 near the edges thereof caused by the presence of container 35 is filled with a synthetic resin such as an epoxide resin or a similar material which may contain powdered rock or a similar material as a filler. Both plates 8, 9 are maintained at the desired gap width 37 by a set of corresponding spacers 39 which are mounted on anchor screws 16. The plates 8, 9 are also provided with corresponding recesses 40 for accepting the connectors 47. The cladding element of this embodiment forms a complete unit or may be combined with other similar elements side by side or one on top of another in order to form a building facade or the like.

Figure 13:
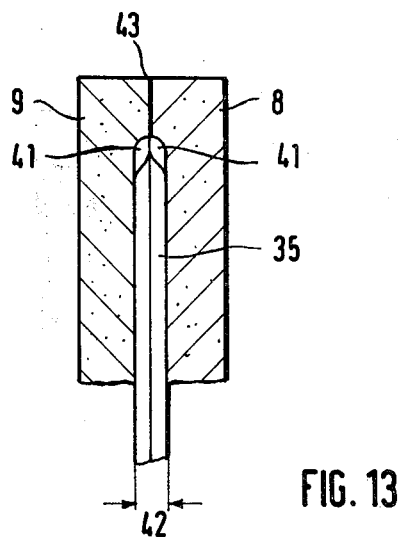
FIG. 13 is a partial sectional view of another cladding element according to the present invention corresponding to the partial sectional view of FIG. 12.

FIG. 13 shows a cladding element similar to that shown in FIG. 12 but provided with recesses 41 worked into the interfacing surfaces of the plates 8, 9 and forming a hollow whose total depth corresponds to the thickness 42 of the container 35. In this embodiment, the plates 8, 9 may be secured together in the region of contact with a glue 43.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A radiant heater comprising a plate of natural occurring stone as distinguished from cast or man-made compositions such as concrete, groove means machined into an outer surface of said stone plate, said groove means comprising a plurality of 360 degree endless circular groove elements machined into said outer surface of said stone plate, said plurality of 360 degree groove elements each having at least one circular portion thereof coincident with another circular portion of a juxtaposed 360 degree groove element such that said coincident circular portion interconnects said juxtaposed 360 degree groove elements, each of said 360 degree groove elements thereby having a coincident circular portion and a non-coincident circular portion, and heating element means disposed in and extending alternatively from a non-coincident portion to a coincident portion such that at least a section of the heating element extends along a non-coincident portion of one 360 degree groove element to a coincident portion between said one 360 degree groove element and a second 360 degree groove element to the non-coincident portion of said second 360 degree groove element to a coincident portion between said second 360 degree groove element and a third 360 degree groove element to the non-coincident portion of said third 360 degree groove element in an undulating and non-linear manner, whereby said heating element means heats said stone to form the radiant heater.

2. A radiant heater according to claim 1 wherein a plurality of parallel rows of said 360 degree groove elements are provided with each adjacent 360 degree groove elements in juxtaposed rows being disposed along a transverse straight line row disposed at an acute angle relative to said plurality of parallel rows.

3. A radiant heater according to claim 2 wherein said transverse straight line rows are disposed perpendicular to said plurality of parallel rows.

4. A radiant heater according to claim 3 wherein each of said parallel rows comprises a plurality of intermediate 360 degree groove elements disposed between two end 360 degree groove elements, said heating element extending along 180 degrees of each of said intermediate 360 degree groove elements.

5. A radiant heater according to claim 2 wherein each of said parallel rows comprises a plurality of intermediate 360 degree groove elements disposed between two end 360 degree groove elements, said heating element extending along less than 90 degrees of each of said intermediate 360 degree groove elements.

6. A radiant heater comprising a plate of natural occurring stone as distinguished from cast or man-made compositions such as concrete, groove means machined into an outer surface of said stone plate, said groove means comprising a plurality of 360 degree endless circular groove elements machined into said outer surface of said stone plate, said plurality of 360 degree groove elements being disposed in a row, each of said 360 degree groove elements in said row having a circular portion thereof coincident with a circular portion of a juxtaposed 360 degree groove element in the row such that said coincident portions interconnect said juxtaposed 360 degree groove elements, each of said 360 degree groove elements thereby having a coincident portion and a non-coincident portion, and heating element means disposed in and extending alternately from a non-coincident portion to a coincident portion such that at least a section of the heating element extends along a non-coincident portion of one 360 degree groove element to a coincident portion between said one 360 degree groove element and a second 360 degree groove element to the non-coincident portion of said second 360 degree groove element to a coincident portion between said second 360 degree groove element and a third 360 degree groove element to the non-coincident portion of said third 360 degree groove element in an undulating and non-linear manner, whereby said heating element means heats said stone to form the radiant heater.

7. A radiant heater according to claim 6 further comprising a second row of said 360 degree groove elements juxtaposed to the first said row with the 360 degree groove elements in the first said row having circular portions thereof coincident with circular portions of juxtaposed 360 degree groove elements in said second row, whereby said heating element extends along the last said coincident circular portions which encompass portions of the 360 degree groove elements in said second row.

8. A radiant heater according to claim 6 wherein said coincident circular portions overlap a distance equal to the breadth of said 360 degree groove elements.

* * * * *